UNITED STATES PATENT OFFICE.

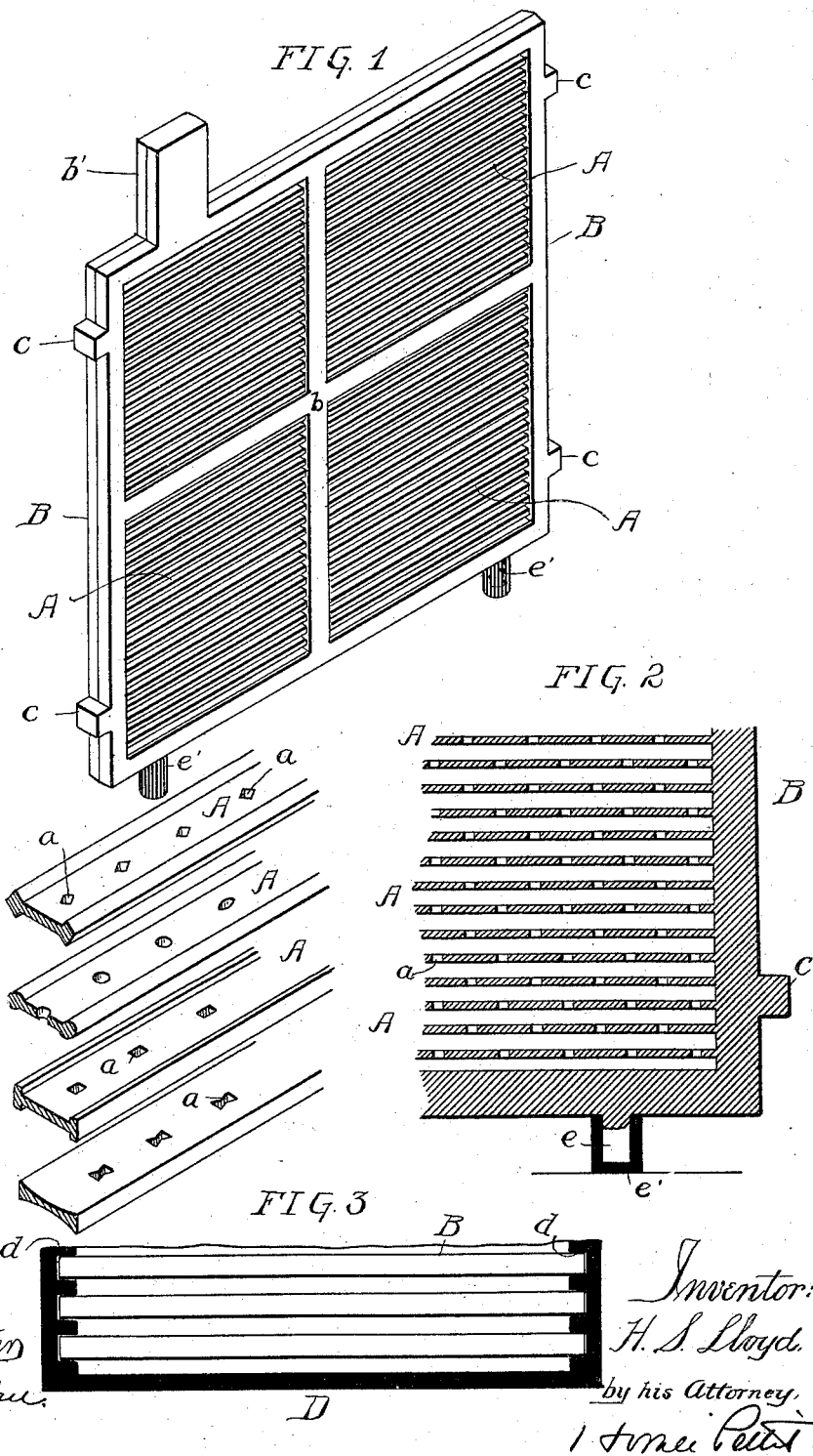

HERBERT S. LLOYD, OF PHILADELPHIA, PENNSYLVANIA.

BATTERY-ELECTRODE.

SPECIFICATION forming part of Letters Patent No. 612,649, dated October 18, 1898.

Application filed September 20, 1897. Serial No. 652,374. (No model.)

*To all whom it may concern:*

Be it known that I, HERBERT S. LLOYD, a citizen of the United States, and a resident of the city of Philadelphia, State of Pennsylvania, have invented certain new and useful Improvements in Battery-Electrodes, of which the following is a full, clear, and exact description, reference being had to the accompanying drawings, forming part of this specification.

My invention relates to certain improvements in secondary batteries of the Planté type, and has for its object to provide an improved form of electrode which will retain its strength and shape during the conversion of the metallic lead into peroxid; and to this end it consists in general in forming the electrode from a series of strips of metallic lead having thickened or reinforced outer edges, as more fully set forth hereinafter.

A further object of my invention is to provide for the insulation of the various electrodes from the material deposited at the bottom of the cell during the operation of the battery, and thus prevent short-circuiting between the electrodes.

In the accompanying drawings, Figure 1 is a perspective view of a battery-electrode constructed in accordance with my invention. Fig. 2 is a longitudinal sectional elevation of a portion of the same. Fig. 3 is a sectional plan view of a portion of a battery cell or casing, showing the arrangement of a number of electrodes therein; and Figs. 4, 5, 6, and 7 are sectional perspective views illustrating on a somewhat larger scale a variety of forms of strips which may be employed in manufacturing electrodes.

In electrodes formed of metallic lead for use in batteries of the Planté type, where all of the metallic lead is converted into peroxid and finely-divided or spongy lead, much difficulty is experienced in preventing the scaling and crumbling of the plates, owing to the fact that nearly all of the strength and rigidity are lost during the charging of the cell.

In carrying out my invention each electrode is formed of a series of comparatively wide strips, giving a large amount of surface area for contact with the electrolyte, and each strip having thickened or reinforced edges, which will have a tendency to last a much longer time than the inner portions of the strip and will act to hold the inner portions of the strip together as it is converted into peroxid.

Referring to the drawings, A represents a series of strips of lead extending either in a vertical or horizontal plane and united at their opposite edges to a supporting-frame B, the latter being preferably cast around the edges of the strip ends, so as to form an integral structure. The frame B may be divided into a series of panels when a large size by one or more ribs $b$, which are also cast upon the strips. The said frame B is composed, preferably, of an alloy which is nonactive or very slightly active, preferably of lead mixed with a small percentage of antimony or bismuth, the antimony or bismuth tending to render the lead, practically speaking, non-active without destroying its conductivity.

On the upper edge of each frame is a block $b'$ for contact with the conductor, and on each side of the frame are lugs $c$, adapted to grooved guideways $d$, formed in the opposite sides of the battery cell or casing D, so that the electrodes will be properly separated from each other.

During the operation of charging and discharging more or less scale will be deposited at the bottom of the cell and unless proper precautions are taken would soon lead to short-circuiting between the electrodes. To prevent this, the electrodes are raised a short distance from the bottom of the cell by step-lugs $e$, around which are placed cups $e'$, of insulating material, the bottom of the electrode being elevated for a distance sufficient to prevent short-circuiting from any accumulation of scale which will be deposited during the normal action of the battery.

The strips A may be of any desired form, preferable constructions being illustrated in Figs. 4, 5, 6, and 7, any of which forms may be produced by passing a strip of metallic lead through suitably-shaped pressing rollers or dies. Each strip is provided with a series of equidistant orifices $a$, which may be of any of the forms illustrated in the various figures, and in practice the orifices are staggered throughout the series of strips in the manner illustrated in Fig. 2.

Having thus described my invention, what I claim, and desire to secure by Letters Patent, is—

1. An electrode comprising a frame of a practically non-active alloy, and thin parallel strips of metallic lead adapted to become in action the active material, and free from interposed paste, said strips being horizontally supported in said frame, electrically connected therewith and having thickened or reinforced outer edges to lengthen the life of the strips in the process of peroxidation.

2. An electrode formed of a series of horizontally-disposed strips of metallic lead forming in action the active material of the electrode and free from interposed paste, each strip being perforated and having thickened or reinforced edges in cross-section, and united at its opposite ends by a supporting-frame of a practically non-active alloy, being electrically connected therewith, the perforations in the respective horizontally-disposed strips being staggered throughout the series, substantially as described.

In testimony whereof I have hereunto set my hand this 16th day of September, A. D. 1897.

HERBERT S. LLOYD.

Witnesses:
HORACE PETTIT,
JNO. E. PARKER.